US011438493B2

(12) United States Patent
Nakamura

(10) Patent No.: US 11,438,493 B2
(45) Date of Patent: Sep. 6, 2022

(54) OPTICAL APPARATUS AND IMAGING SYSTEM HAVING THE SAME

(71) Applicant: CANON KABUSHIKI KAISHA, Tokyo (JP)

(72) Inventor: Tsubasa Nakamura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 188 days.

(21) Appl. No.: 16/946,373

(22) Filed: Jun. 18, 2020

(65) Prior Publication Data

US 2020/0412921 A1   Dec. 31, 2020

(30) Foreign Application Priority Data

Jun. 27, 2019   (JP) .............................. JP2019-120228

(51) Int. Cl.
*H04N 5/225* (2006.01)
*G02B 9/10* (2006.01)

(52) U.S. Cl.
CPC ............. *H04N 5/2254* (2013.01); *G02B 9/10* (2013.01)

(58) Field of Classification Search
CPC ...... H04N 5/2254; H04N 5/2258; G02B 9/10; G02B 27/1013; G02B 27/123
See application file for complete search history.

(56) References Cited

U.S. PATENT DOCUMENTS

| 8,228,417 | B1 * | 7/2012 | Georgiev | G03B 11/00 |
| | | | | 359/368 |
| 9,911,183 | B2 * | 3/2018 | Hatakeyama | G06T 5/20 |
| 10,072,970 | B1 * | 9/2018 | Twede | G01J 1/0488 |
| 2009/0027542 | A1 * | 1/2009 | Yamamoto | H04N 5/22541 |
| | | | | 348/340 |
| 2009/0122175 | A1 * | 5/2009 | Yamagata | G02B 27/1066 |
| | | | | 348/335 |
| 2012/0044393 | A1 * | 2/2012 | Ono | G01J 3/513 |
| | | | | 348/265 |
| 2015/0234150 | A1 * | 8/2015 | Katsunuma | H04N 5/2254 |
| | | | | 348/360 |

FOREIGN PATENT DOCUMENTS

| JP | 2000102040 A | | 4/2000 |
| JP | 2012044473 A | | 3/2012 |
| JP | 6123213 B2 | | 5/2017 |
| JP | 2019082412 A | * | 5/2019 |
| JP | 2019082412 A | | 5/2019 |

* cited by examiner

*Primary Examiner* — Sinh Tran
*Assistant Examiner* — Zhenzhen Wu
(74) *Attorney, Agent, or Firm* — Carter, DeLuca & Farrell LLP

(57) ABSTRACT

An optical apparatus includes a lens part including a first imaging portion forming a first image of an object and a second imaging portion forming a second image of the object, and a filter part including a filter arranged on at least one of optical axes of the first and second imaging portions and configured to make properties of light for forming the first image and light for forming second image different from each other. The first and second images correspond to a common field stop. F numbers of the first and second imaging portions are different from each other.

17 Claims, 8 Drawing Sheets

(REGION OF FIG. 4)

OPTICAL APPARATUS AND IMAGING SYSTEM HAVING THE SAME

BACKGROUND OF THE INVENTION

Field of the Invention

The present invention relates to an optical apparatus and an imaging system having the same.

Description of the Related Art

A method of analyzing a composition of an object and discriminating an object that is difficult for a human to visually recognize with high accuracy have been proposed using a camera that can acquire information about the three RGB bands (wavelength bands) that match human visual characteristics, as well as visible and invisible band information.

A silicon sensor generally used as an image sensor has a characteristic that signal sensitivity to light having a wavelength apart from a design center wavelength lowers. Thus, when one image sensor photoelectrically converts a plurality of images formed from light of different wavelength components at the same time, a distribution occurs in the intensity of the acquisition signal, and the dynamic range of the acquisition signal corresponding to the light of the wavelength component on the low sensitivity side narrows.

Japanese Patent No. 6123213 discloses a camera to align an intensity of an acquisition signal by adjusting a transmittance of a bandpass filter.

However, the camera of Japanese Patent No. 6123213 reduces the transmittance of the bandpass filter corresponding to the light of visible band where signal sensitivity is high to lower the intensity of the incident light, and thus decreases the light use efficiency with respect to the incident light.

SUMMARY OF THE INVENTION

The present invention provides an optical apparatus adjustable balance of an acquisition signal for each wavelength while suppressing deterioration of incident light intensity, and an imaging system having the same.

An optical apparatus according to one aspect of the present invention includes a lens part including a first imaging portion forming a first image of an object and a second imaging portion forming a second image of the object, and a filter part including a filter arranged on at least one of optical axes of the first and second imaging portions and configured to make properties of light for forming the first image and light for forming second image different from each other. The first and second images correspond to a common field stop. F numbers of the first and second imaging portions are different from each other.

Further features of the present invention will become apparent from the following description of exemplary embodiments with reference to the attached drawings.

DESCRIPTION OF THE EMBODIMENTS

Figures 1A, 1B:
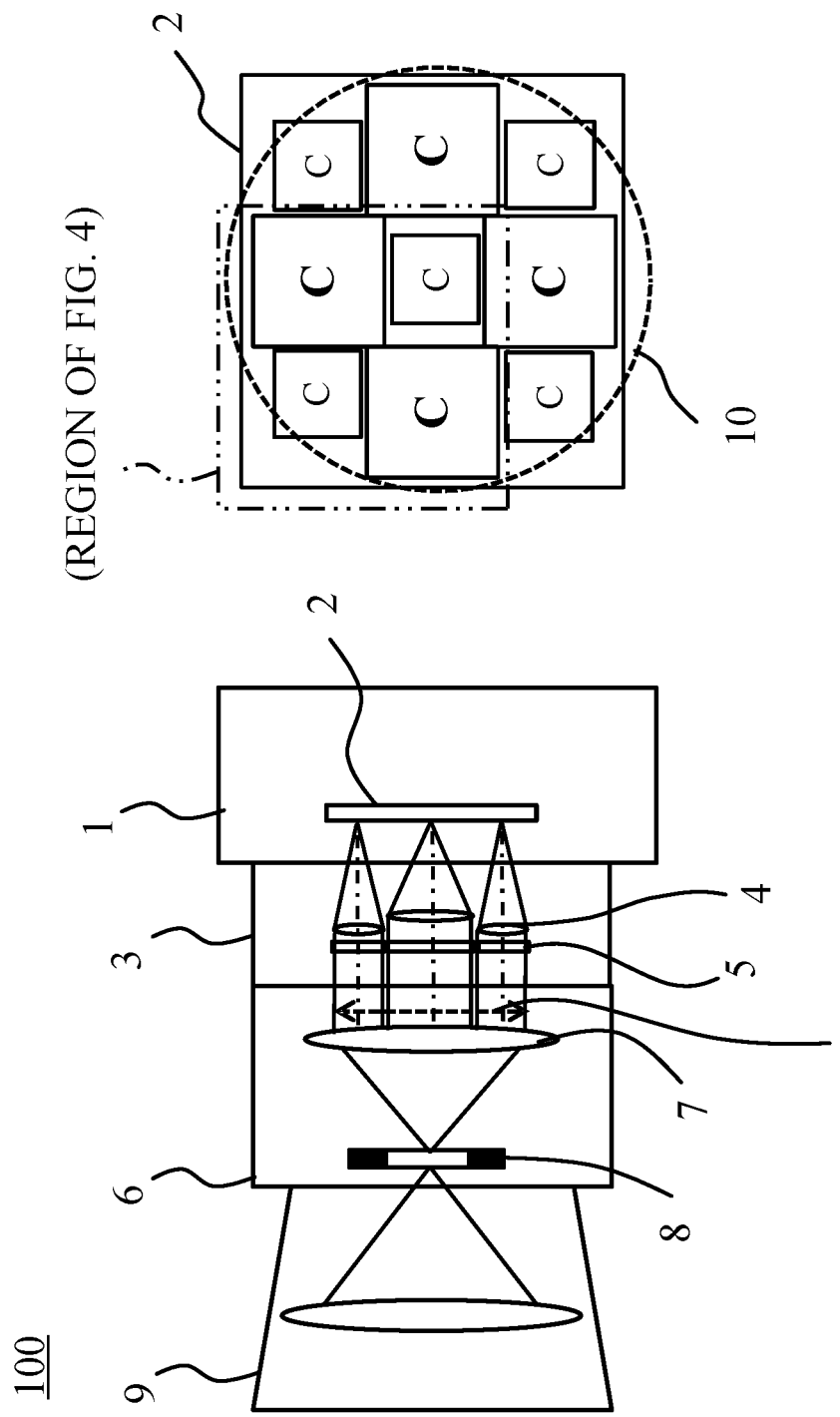
FIGS. 1A and 1B are explanatory diagrams of an imaging system according to an embodiment of the present invention.

Exemplary embodiments of the invention will be described below with reference to the accompanied drawings. In each of the drawings, the same elements will be denoted by the same reference numerals and the duplicate descriptions thereof will be omitted.

First, the basic configuration of the present invention will be described. The basic configuration described below is common to each of examples described later.

FIGS. 1A and 1B are explanatory diagrams of an imaging system 100 according to an embodiment of the present invention. FIG. 1A is a sectional view of the imaging system 100. FIG. 1B is a front view of an image pick up element (image sensor) provided in the camera body 1. The symbol C indicates an object image. Further, the rectangle surrounding the symbol C schematically shows a section (image section) IB of an image formed by a plurality of lens units (imaging portion) included in a lens array 4 in the image pickup plane.

An array unit (optical apparatus) 3 has lens array (lens part) 4 and a filter array (filter part) 5, and is detachably attached to the camera body (image pickup apparatus) 1. The lens array 4 has a plurality of lens units and forms a plurality of images (object images) on the image pickup plane of the image sensor 2. The filter array 5 is arranged on the object side of the lens array 4 and includes a plurality of filters each having different optical characteristics. The optical characteristics are characteristics to change a wavelength of incident light and characteristics to change a state of polarization of the incident light. In this embodiment, providing the filter array 5 simultaneously forms an image of the same object for each wavelength from a visible band to a near infrared band on the image pickup plane of the image sensor 2. In this embodiment, the acquisition band can be easily changed by replacing the array unit 3.

Each of the filters corresponds to the lens units (imaging portion) one-to-one. That is, only one filter is arranged for one lens unit. As a result, each filter receives all the light that passes through the corresponding lens unit. In this way, the filter corresponding to one lens unit has one kind of transmission characteristics, and thus the brightness in each image section can be well controlled (details will be described later).

The image sensor 2 is composed of one large-sized sensor in this embodiment, but may be composed of small-sized image sensors of the image section IB closely arranged. Additionally, the surface of the image sensor 2 does not have to be flat, and may have some curvature as long as smoothness is ensured. Further, when the image sensor 2 is configured by arranging small image sensors, the small-sized image sensors may be finely adjusted in the optical axis direction. Even in these cases, if the plurality of images generated by the lens array 4 can share a smooth image plane to some extent, they can be regarded as "continuous image pickup planes".

A multispectral image can be obtained by superimposing the images for each wavelength simultaneously generated on the image pickup plane of the image sensor 2 in the three-dimensional (wavelength axis) direction. At this time, since it is necessary that the information in the spatial directions substantially match, it is preferable that the plurality of images formed by the lens array 4 are generated with the same perspective (angle of view).

A field stop 8 is arranged at a position of an image plane of an objective lens 9 and determines the angle of view of each image. That is, the field stop 8 functions as a primary image plane in the entire optical system. Light emitted rearward from the primary image plane is converted into collimated light by a collimating lens (collimating optical system) 7 in a collimating unit 6. A collimated light flux 10 emitted from the collimating lens 7 has a diameter larger than the effective diameter of the entire lens array 4. In FIGS. 1A and 1B, only the light flux with the on-axis field angle of the objective lens 9 is illustrated, but the collimated light flux 10 has a diameter larger than the effective diameter of the lens array 4 even in the light flux with the off-axis field angle. As the plurality of lens units included in the lens array 4 commonly receive the light flux having the angle of view formed by the optical system in the preceding stage, the lens array 4 can generate the plurality of images in which the spatial information sufficiently matches.

Figure 2A:
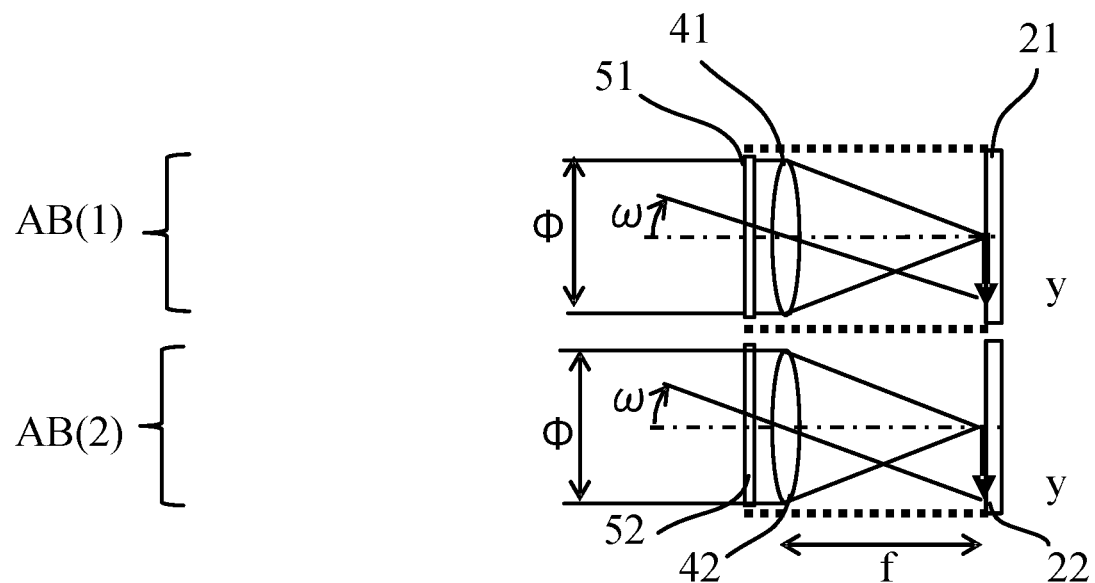
FIGS. 2A and 2B are explanatory drawings of a subject of general lens array design.
Figure 2B:
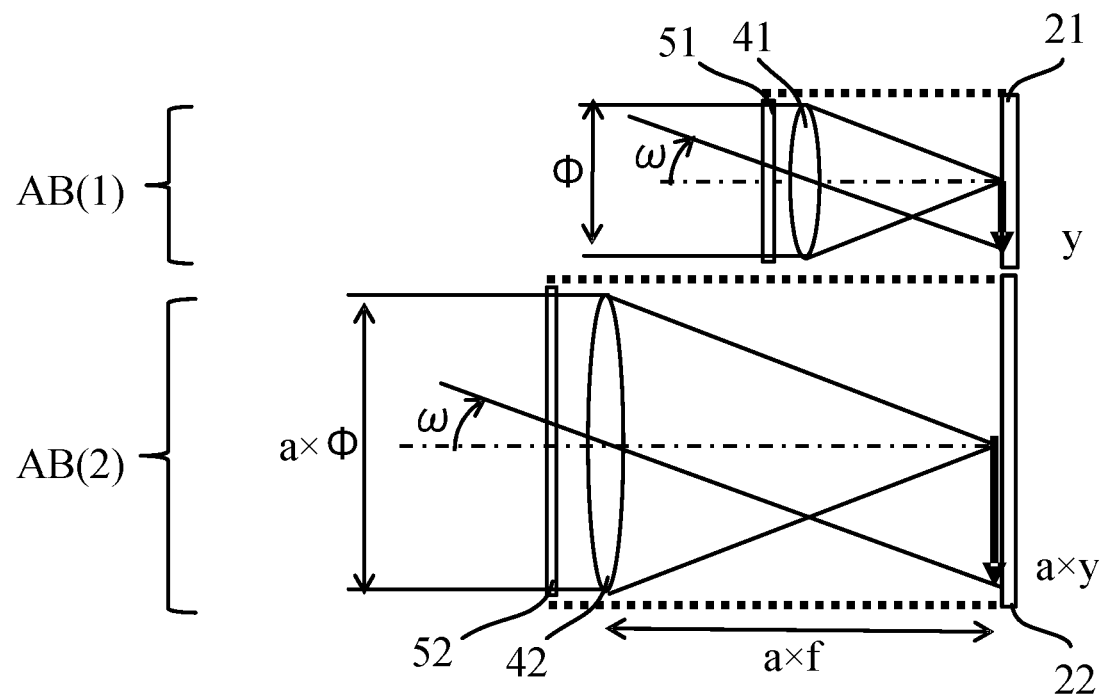

Next, the design of the plurality of lens units included in the lens array 4 will be described. FIGS. 2A and 2B are explanatory drawings of a subject of general lens array design. In FIGS. 2A and 2B, the combination of the lens unit and the image section is represented by a section AB(x). In this embodiment, each lens unit is composed of one lens, but may be composed of a plurality of lenses.

FIG. 2A is a schematic diagram when the image section is equally divided, and illustrates a set of adjacent sections AB(1) and AB(2) as a minimum unit. The section AB(1) has a bandpass filter 51, a lens unit 41, and a divided area 21 of the image sensor 2. The section AB(2) includes a bandpass filter 52, a lens unit 42, and a divided area 22 of the image sensor 2. Additionally, the reference value of each image height is y, and the reference value of the aperture (the effective range of the surface on the most object side of the lens unit) is 1. Further, the outmost incident angle w, which defines the angle of view of the lens unit 41, of incident light is equal to the most incident angle w, which defines the angle of view of the lens unit 42, of incident light. That is, the angle of view of the lens unit 41 and the angle of view of the lens unit 42 are equal. In this embodiment, the angle of view is the open angle of light reaching the outermost circumference of the image circle of the optical system. The term "equal" here includes not only the case of being exactly equal but also the case of "substantially equal". For example, even if each lens unit is designed to have the same angle of view, a slight difference may occur in each angle of view due to manufacturing errors, but in that case, the each angle of view can be regarded as equal to each other. Since the sectional length of the lens array 4 is regulated by the sectional length of the image sensor 2, the diameter of each lens unit is also constrained by the length obtained by equally dividing the image sensor 2. That is, the relational expression of Φ≤2y is satisfied.

Here, it is assumed that the section AB(2) is a section in the near infrared band where the sensitivity of the image sensor 2 is low. FIG. 2B is a schematic diagram when the aperture Φ of the section AB(2) is expanded to a×Φ to increase the acquisition signal. In the section AB(2), the image height y is a×y in proportion to the increase in the aperture according to the relational expression Φ≤2 y. According to the correlation between the focal length f and the outmost incident angle ω (y=f×tan ω), in the section AB(x), the F value of the lens unit does not change even if the aperture is widened as shown in the following expression (1).

$$F=f/\Phi=y/(\Phi\times\tan\omega)\geq 1/(2\times\tan\omega) \quad (1)$$

From the expression (1), the minimum value of the F value of the lens unit is determined only by the outmost incident angle ω. For example, when the bandpass filter is a narrow bandpass filter formed by stacking multilayer films, the outmost incident angle ω cannot be made too large considering the angle dependence of the transmission wavelength. Assuming that the outmost incident angle ω is about 5 [deg], the minimum value of the F value is limited to about 5.7. Thus, in a dark photographing environment such as a room, an image of infrared wavelength where the silicon sensor has a low sensitivity becomes a noisy image.

On the contrary, in order to increase (darken) the F value of the wavelength with high sensitivity to balance, the F value can be increased by reducing the aperture Φ with the image height y fixed. However, the light use efficiency decreases as in the case where the transmittance of the bandpass filter reduces. Further, if the aperture Φ simply reduces, the resolution will decrease due to the diffraction phenomenon.

Example 1

Figures 3A, 3B:
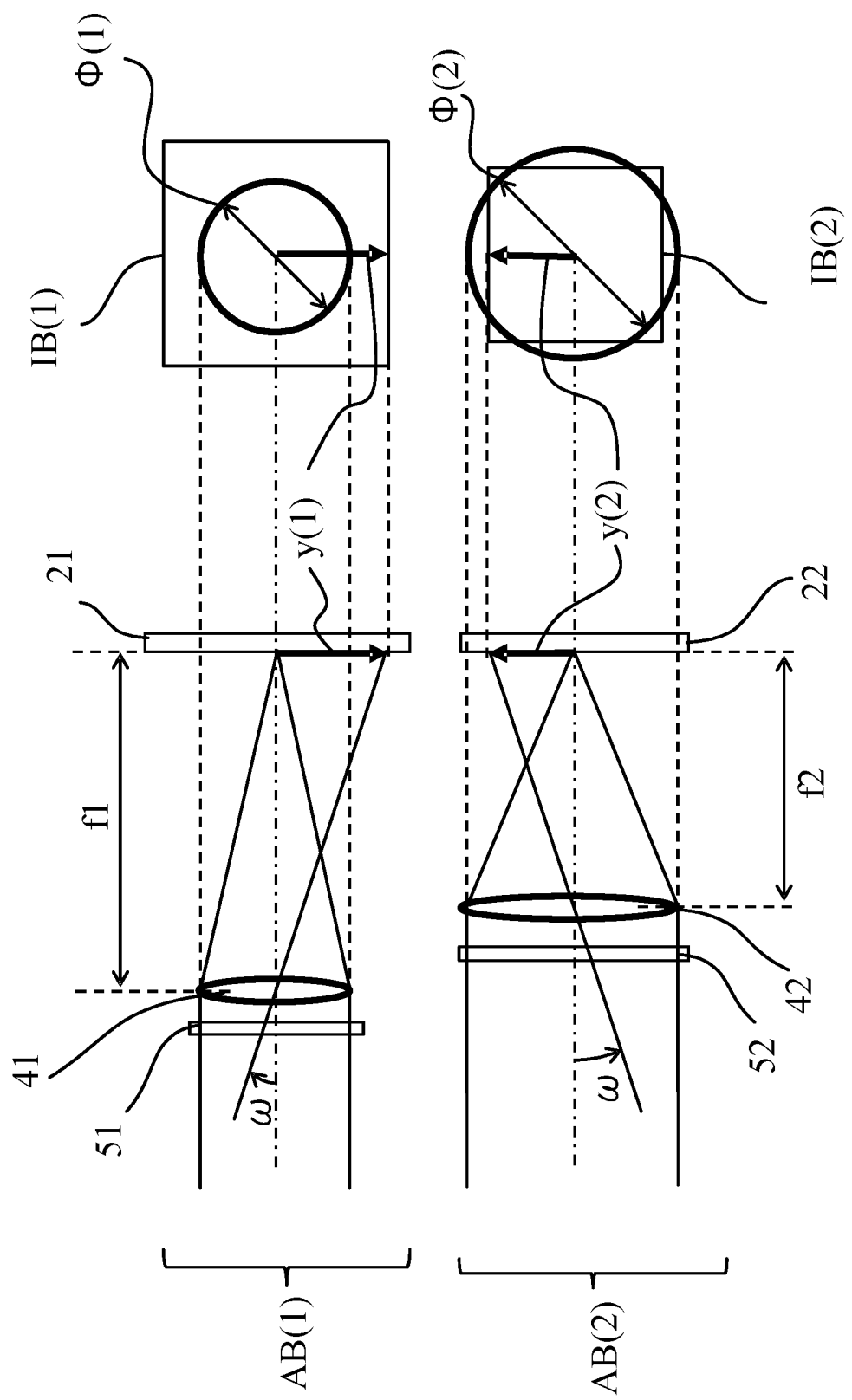
FIGS. 3A and 3B are explanatory drawings of lens array design according to Example 1.

FIGS. 3A and 3B are explanatory drawings of lens array design according to this example. FIGS. 3A and 3B are respectively a sectional view of a section and a front view (transmission view) of the image pickup plane viewed from the object side.

In the configuration of this example, the outmost incident angle ω of the incident light that defines the angle of view of each lens unit in the lens array 4 is the same, and the F number of the lens units is different. In the section AB(1), the maximum value of the distance from the optical axis of the lens unit 41 to the aperture Φ(1) is smaller than the minimum value of the distance from the optical axis of the lens unit 41 to the image section IB(1). Further, in the section AB(2), the maximum value of the distance from the optical axis of the lens unit 42 to the aperture Φ(2) is larger than the minimum value of the distance from the optical axis of the lens unit 42 to the image section IB(2). Regarding the section AB(2), as the relational expression Φ≤2y is not applied and the focal length f2 is smaller than the focal length f1, the F value constrained by the outmost incident angle ω of the incident light can be significantly reduced, and the brightness can be secured. Regarding the section AB(1), the F value is larger than the F value of the section AB(2), and the size of the image section IB(1) is larger than the size of the image section IB(2), so that a high resolution image can be obtained. Thus, in spectral imaging, if the visible band light with high sensitivity of the silicon sensor is assigned to the section AB(1) and the infrared light with low sensitivity of the silicon sensor is assigned to the section AB(2), the acquisition signal can be balanced. Also, by assigning a higher resolution to light in the visible band, which is information that can be seen by human beings, it becomes easier to obtain a natural sense of resolution in the later combining process.

Figure 4:
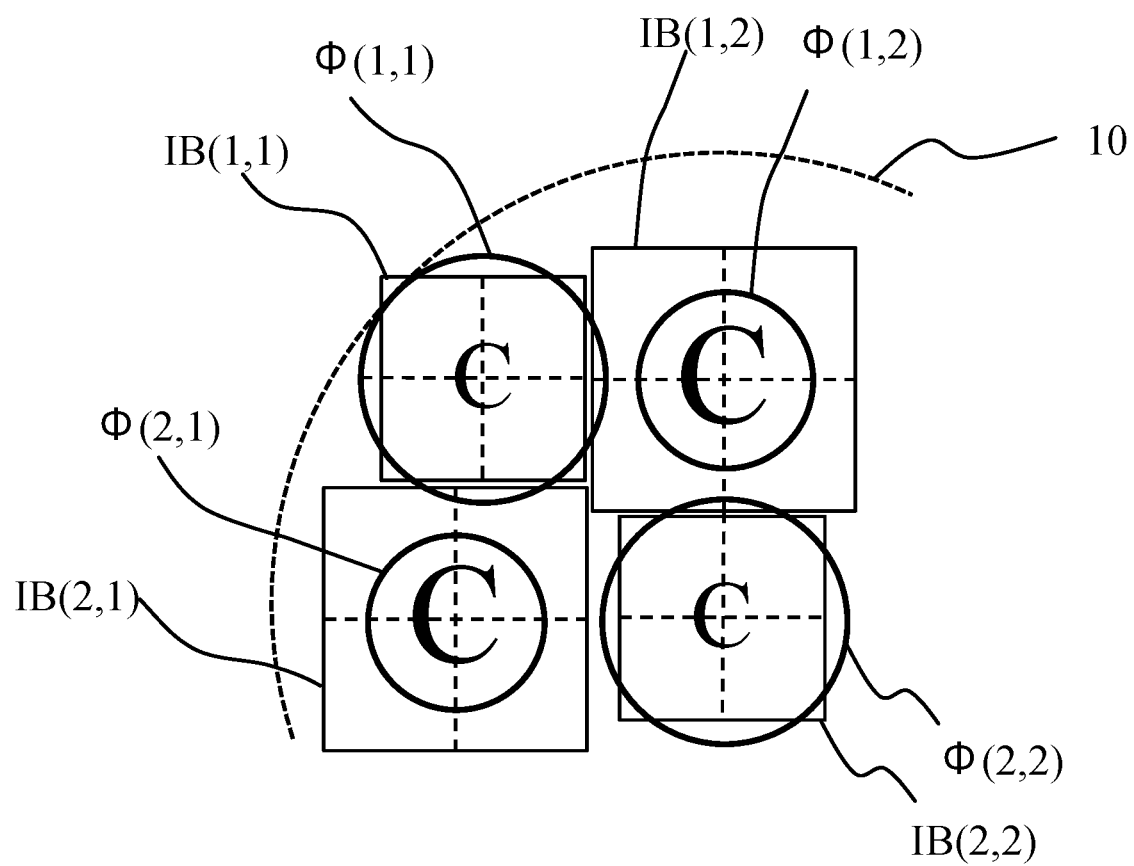
FIG. 4 is a front view of an image pickup plane according to Example 1.

If the combination of the sections AB(1) and AB(2) is a nested structure, the utilization rate of the incident light to the lens array 4 can further increases. FIG. 4 is a front view of the image pickup plane of the image sensor 2 when the lens array 4 has a nested structure, and is an enlarged view of a region surrounded by a chain double-dashed line in FIG. 1B. Sections with subscripts (1,1) and (2,2) correspond to the section AB(2) in FIGS. 3A and 3B, and sections with subscripts (1,2) and (2,1) correspond to the section AB(1) in FIGS. 3A and 3B.

In adjacent sections AB(1) and AB(2), the aperture Φ(2) is arranged to project to the image section IB(1), so that the lens units can be arranged closer to each other. That is, ratio of the aperture per unit area in the lens array 4 can increases.

Further, the collimated light flux 10 does not necessarily have to pass through the entire area of the image pickup plane, but may pass through each aperture in the lens array 4. Thus, if each aperture in the lens array 4 is arranged in a substantially circular shape in accordance with the collimated light flux 10 as in this example, the light use efficiency of the incident light incident on the imaging system (objective lens 9) can be further improved.

In this example, the aperture Φ of the lens unit is represented by a circle and the image section is represented by a rectangle, but there is no limitation to these shapes. For example, the aperture Φ may be a rectangle with the diameter of the illustrated circle as one side, and with such a shape, the aperture area can be more secured, and the light use efficiency of incident light can be improved. Similarly, in the image section, the utilization efficiency of the sensor surface can be improved by forming a circle whose diameter is a diagonal of a rectangle or a polygon.

According to the configuration of this example, as the F value can be largely changed for each lens unit in the lens array 4, it is possible to suppress the decrease in the intensity of the incident light and to adjust the balance of the acquisition signal for each wavelength.

Example 2

Figures 5A, 5B:
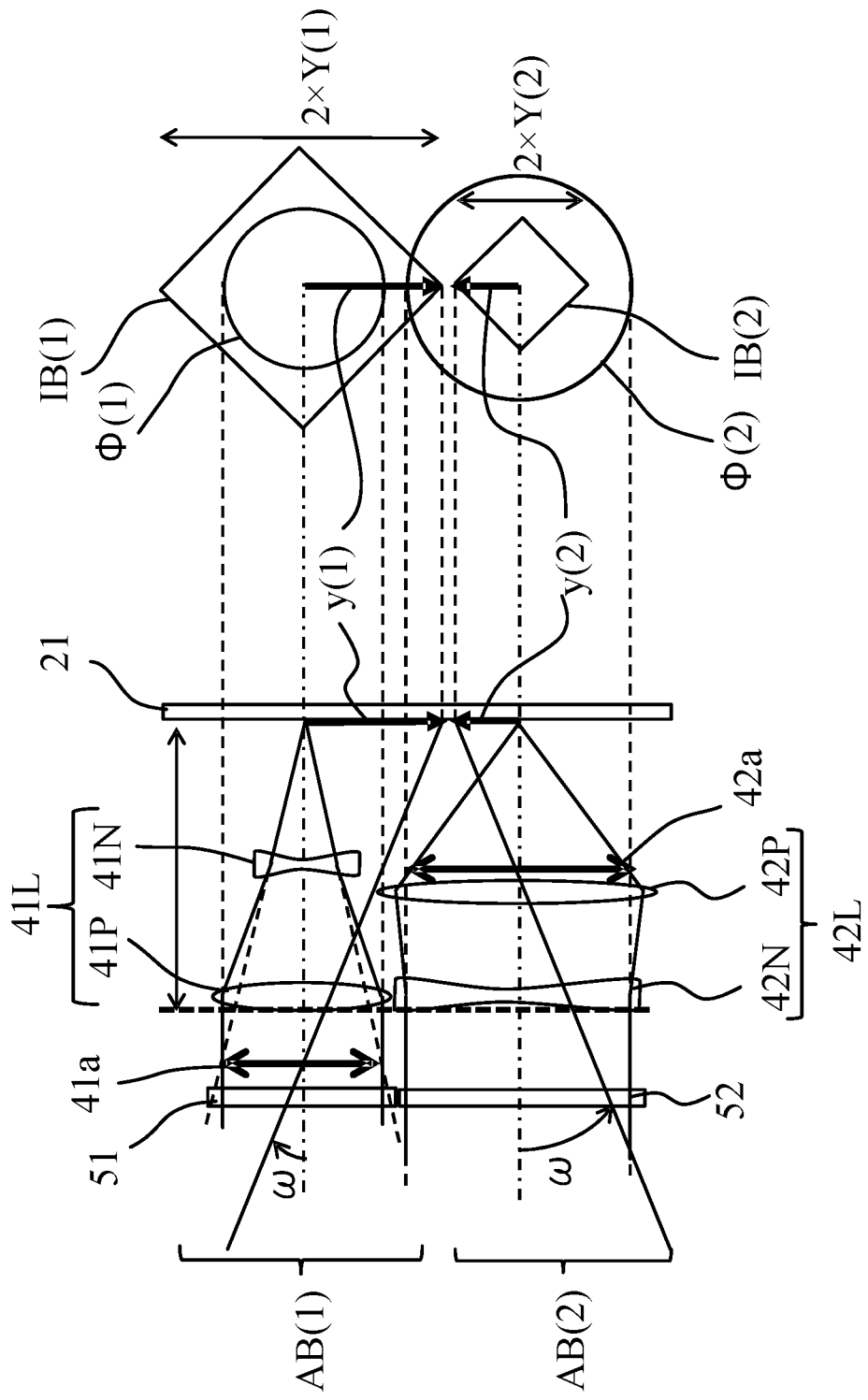
FIGS. 5A and 5B are explanatory drawings of lens array design according to Example 2.

FIGS. 5A and 5B are explanatory drawings of lens array design according to this example. FIGS. 5A and 5B are respectively a sectional view of a section and a front view (transmission view) of the image pickup plane viewed from the object side.

The configuration of Example 1 is a configuration in which the outmost incident angle ω is sufficiently small and the difference in focal length between the lens units is also sufficiently small. The configuration of this example is a configuration in which the most incident angle ω is larger than the most incident angle ω of Example 1, or the difference in focal length between the lens units is large (the difference in F value is large).

If a large difference in focal length between the sections AB(1) and AB(2) is taken, principal point positions 41a and 42a of each lens unit will be greatly separated in the optical axis direction. If the lens array is made up of a single lens system, the principal point position substantially coincides with the lens position, so that a step in the optical axis direction is formed on the first surface of the lens unit. When viewed from the object side, the section AB(2) has a concave shape, and off-axis light is vignetted by the lens unit corresponding to the section AB(1) in the periphery. If the degree is large, off-axis light is completely shielded, and it becomes impossible to obtain images with the same angle of view between the lens units. This becomes more remarkable as the difference in focal length between lens units or the outmost incident angle ω increases.

Thus, in this example, the power arrangement of the lens in each section is adjusted while maintaining the position of the principal point. Specifically, in the section AB(1), a lens unit 41L includes, in order from the object side to the image side, a lens unit 41P having a positive refractive power, and a lens unit 41N having a negative refractive power. In the section AB(2), the lens unit 42L includes, in order from the object side to the image side, a lens unit 42N having a negative refractive power, and a lens unit 42P having a positive refractive power.

According to the configuration of this example, it is possible to make the first surface of the lens units in each section uniform, and to greatly change the F value for each lens unit in the lens array 4 while suppressing the loss of the incident light.

Example 3

Figures 6A, 6B:
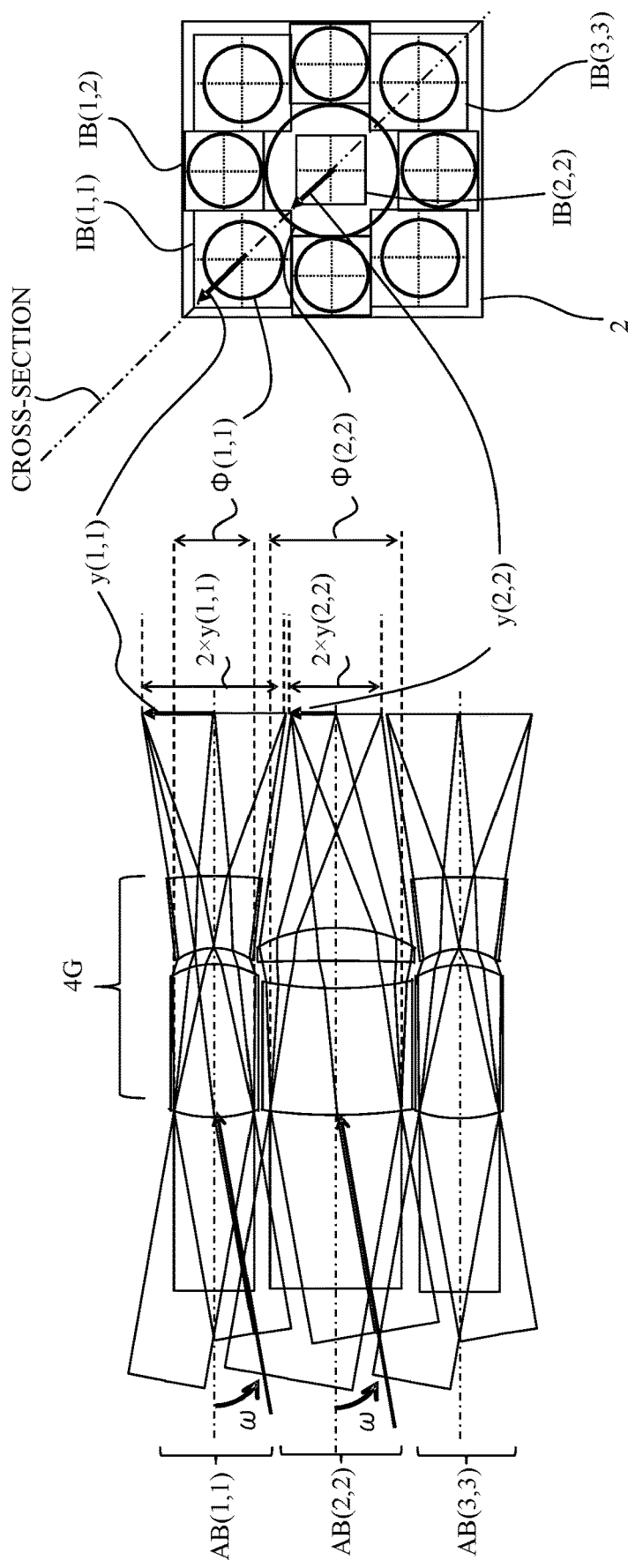
FIGS. 6A and 6B are explanatory drawings of lens array design according to Example 3.

FIGS. 6A and 6B are explanatory drawings of lens array design according to this example. FIGS. 6A and 6B are respectively a sectional view of a section in a diagonal direction of the image pickup plane of FIG. 6B and a front view (transmission view) of the image pickup plane viewed from the object side.

In this example, the lens array 4 is made up of three types of lens units, and each section is densely arranged. The section AB(1,1) has a configuration having a long focal length and a large F value. The section AB(2,2) has a configuration having a short focal length and a small F value. The section AB(3,3) has the same configuration as the section AB(1,1).

In this example, in FIG. 6B, a section adjacent to the section AB(2,2) in a diagonal direction opposite to the direction of the cross section of FIG. 6A also has the same configuration as the section AB(1,1). Further, in FIG. 6B, sections adjacent to the section AB(2 2) in the horizontal direction and the vertical direction has the same configuration as the section AB(1,2). That is, in this example, the lens array 4 is composed of three types of lens units corresponding to the sections AB(1,1), AB(1,2), and AB(2,2).

According to the configuration of this example, the F number of the lens units in the lens array 4 can be distributed in a wide range from about 2.0 to 5.1.

Specific design values of each lens will be given in numerical example 1. In the surface data of numerical example 1, r is a radius of curvature of each optical surface, and d(mm) is an axial distance (distance on the optical axis) between the m-th and the (m+1)-th surfaces. m is the number of the surface counted from the light incident side. Further, nd is a refractive index of each optical member with respect to the d-line, and vd is an Abbe number of the optical member.

Where Nd, NF, and NC are refractive indices to the Fraunhofer d-line (587.6 nm), F-line (486.1 nm), and C-line (656.3 nm), the Abbe number vd of a certain material is expressed by the following expression:

$$vd=(Nd-1)/(NF-NC)$$

In numerical example 1, d, focal length (mm), F number (F value), and Half angle of view (degree) are all values when the optical system of each Example focuses on an object at infinity. A backfocus (BF) is an air-converted length of a distance on the optical axis from a final lens surface (lens surface closest to the image side) to a paraxial image plane. An "overall lens length" is a length obtained by adding the backfocus to a distance on the optical axis from a front surface (lens surface closest to the object) of the optical system to the final surface. The "lens unit" is not limited to the case of being composed of a plurality of lenses, and includes the case of being composed of one lens. When each imaging portion of the lens array 4 is composed of a plurality of lenses, the F number is a F number of the lens closest to the object.

When the optical surface is an aspherical surface, the symbol "*" is added to the right of the surface number. When X is an amount of displacement from a surface vertex in the optical axis direction, h is a height from the optical axis in a direction perpendicular to the optical axis, R is a paraxial radius of curvature, k is a conic constant, A4, A6, A8, and A10 are aspherical coefficients of each order, the aspherical shape is expressed by the following expression:

$$X=(h^2/R)/[1+\{1-(1+k)(h/R)^2\}^{1/2}+A4\times h^4+A6\times h^6+A8\times h^8$$

"e±x" in the aspherical coefficient represents "10±x".

Example 4

Figures 7A, 7B:
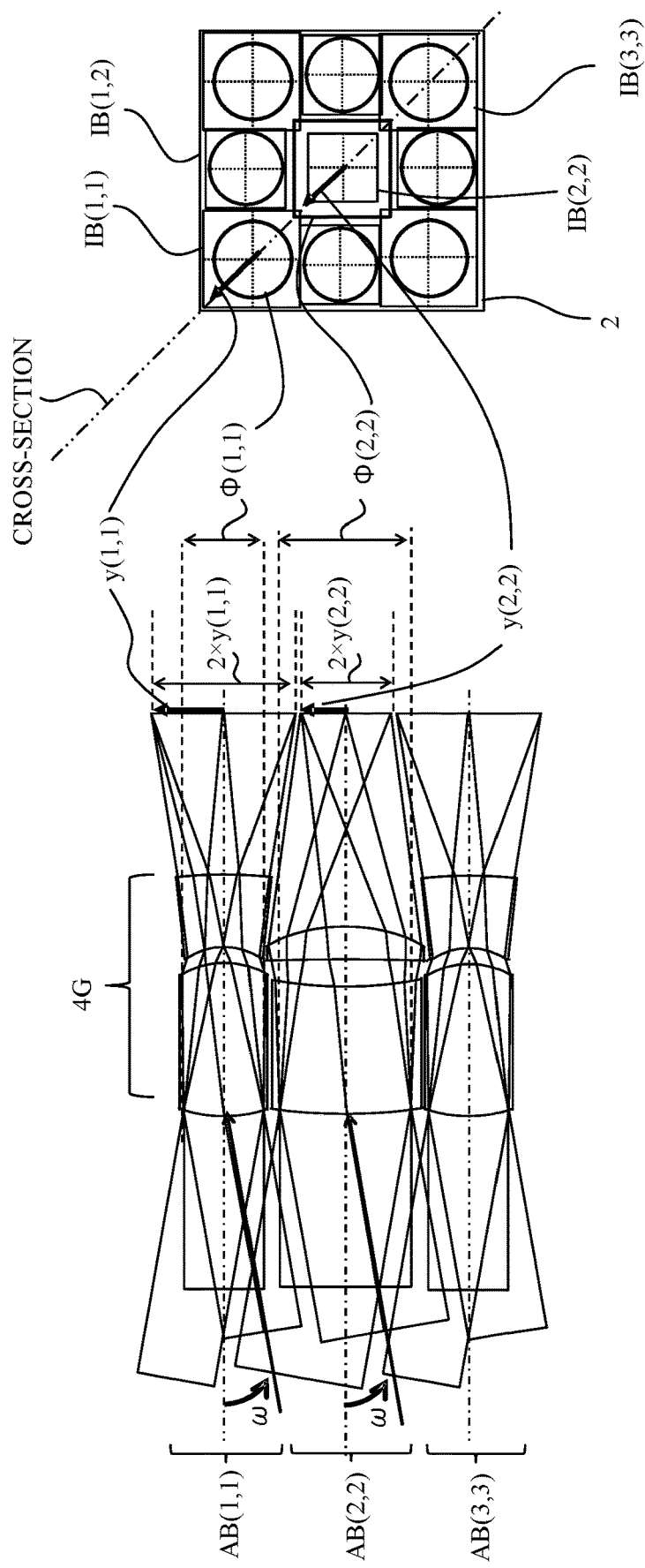
FIGS. 7A and 7B are explanatory drawings of lens array design according to Example 4.

FIGS. 7A and 7B are explanatory drawings of lens array design according to this example. FIGS. 7A and 7B are respectively a sectional view of a section in a diagonal direction of the image pickup plane of FIG. 7B and a front view (transmission view) of the image pickup plane viewed from the object side.

In this example, an outer shape of a lens unit 4G in the section AB(2,2) is cut into a rectangle. As a result, as illustrated in FIG. 7B, it is possible to bring sections adjacent to the section AB(2,2) in the horizontal direction and the vertical direction inward as compared with the case of FIG. 6B. As a general image sensor has a rectangular shape, such an arrangement makes it possible to better fit each image section in the image pickup plane and improve the utilization efficiency of the image pickup plane. Thus, it is possible to use the image sensor 2 having a smaller area than the image sensor 2 of Example 3. Further, cutting the outer diameter makes the area of the aperture Φ(2,2) smaller than that of Example 3, so that the effective F value is slightly larger. Accordingly, when comparing an optical system in which the aperture Φ is not circular as this example with other optical systems, it is desirable to regard the comparative scale (index) Tnoi represented by the following expression (2) as the F value.

$$Tnoi=fi/\sqrt{(4/\pi\times Si\times Tri)} \quad (2)$$

Here, i (=1, 2, . . . ) is the number of the imaging portion (lens unit), fi is a focal length of the i-th imaging portion, Si is an area of an aperture of the i-th imaging portion, and Tri is a transmittance per unit area of the aperture of the imaging portion.

Hereinafter, the value of the index Tno in the expression (2) will be referred to as the "T value". Regarding the second imaging portion in the section AB(2,2), when the transmittance Tr2 is set to 1, the T value Tno2 ($=f2/\sqrt{(4/\pi\times S2\times Tr2)}$) of Example 3 and the T value Tno2 of this example are 1.96 and 2.46, respectively. Further, regarding the first imaging portion in the section AB(1,1) of this example, when the T value Tr1 is set to 1, the T value Tno1 ($=f1/\sqrt{(4/\pi\times S1\times Tr1)}$) is 5.1. As described above, in this example, the values of Tno1 and Tno2 corresponding to the F values of the first and second imaging portions are made different from each other, thereby sufficient brightness can be obtained in the section AB(2,2) while ensuring the resolution in the section AB(1, 1). If necessary, the shape of the aperture Φ(1,2) of the section AB(1,2) may be a square having a diameter of the side length to increase the aperture area.

Example 5

In Example 4, an example in which the distribution of the effective luminous flux of the entire lens array is changed depending on the aperture shape and arrangement of the lens units has been described. In this example, a variation example of the change in the distribution of the effective luminous flux of the entire lens array will be described.

Figure 8:
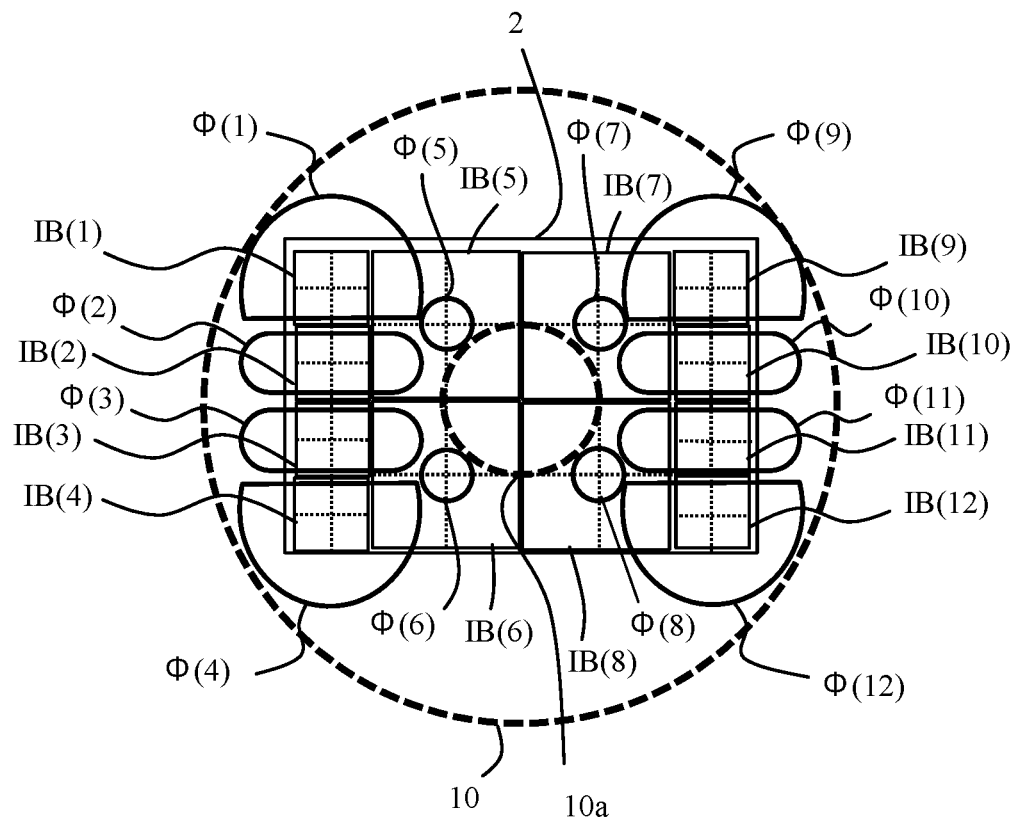
FIG. 8 is a front view of an image pickup plane according to Example 5.

FIG. 8 is a front view of an image pickup plane according to this example. In this example, the image sections IB(1) to IB(12) have a rectangular shape. To develop the image of the object in each image section, the lens units may be arranged so that the optical axis passes through the center of the image section. The optical axis passes through the point where the two dotted lines in each image section intersect. As the imaging relationship is determined only by the optical axis, the principal point position, and the angle of view in the pinhole model, the center coordinates of the lens unit and the image division are determined only by them, and the focal length is also automatically determined from the image division (image height y). The T value, which is a factor of brightness, is adjusted by the shapes (areas) of apertures Φ(1) to Φ(12). The aperture shape can be freely designed as long as it does not interfere with adjacent lens units. In this example, the lens units are densely arranged by combining a half-moon shape like aperture Φ(1), Φ(4), Φ(9), or Φ(12), and an oval shape like aperture Φ(2), Φ(3), Φ(10), or Φ(11). In these sections, the aperture area is larger than the area of the image section, and the T value can be made relatively bright. On the other hand, the area near the center of the image sensor 2 is made smaller than the area of the image section corresponding to apertures Φ(5), Φ(6), Φ(7), and Φ(8), and the aperture area is intentionally set in the center area of the image sensor 2. With such a configuration, the optical system can be realized without using a central portion 10a of the collimated light flux 10 incident on the lens array 4. Such an optical system can be used for an optical system in which the objective lens 9 or the collimating lens 7 emits a toric light beam like the catadioptric system. In general, a reflecting optical system, which is represented by a catadioptric system, can have a short overall length with respect to the focal length and has extremely small chromatic aberration. By combining with the configuration of this example, it is possible to shorten the overall length of the entire optical system and more easily perform aberration correction for each wavelength.

Numerical Example 1

AB(1, 1)
unit mm
Surface data

| Surface | r | d | nd | vd | Effective diameter |
|---|---|---|---|---|---|
| 1* | 8.061 | 9.68 | 1.51633 | 64.1 | 5.00 |
| 2 | −5.112 | 0.99 | | | 5.90 |
| 3 | −4.179 | 4.55 | 1.85400 | 40.4 | 5.18 |
| 4 | −30.577 | 10.26 | | | 7.60 |
| image plane | ∞ | | | | |

-continued

Aspheric Data
First surface

K = 0.00000e+000  A 4 = −2.44241e−004  A 6 = −2.41737e−006
A 8 = −4.06133e−007

| | |
|---|---|
| Focal length | 25.61 |
| F-number | 5.12 |
| Half angle of view (°) | 10.00 |
| Image height | 4.56 |
| Overall lens length | 25.49 |
| BF | 10.26 |

AB(2, 2)
unit mm
Surface data

| Surface | r | d | nd | vd | Effective diameter |
|---|---|---|---|---|---|
| 1* | 24.168 | 8.03 | 1.90270 | 31.0 | 8.29 |
| 2 | 24.843 | 1.71 | | | 9.48 |
| 3 | 189.241 | 2.06 | 1.74100 | 52.6 | 10.25 |
| 4 | −10.411 | 13.51 | | | 10.53 |
| image plane | ∞ | | | | |

Aspheric Data
First surface

K = 0.00000e+000  A 4 = −1.60985e−004  A 6 = −5.13675e−008
A 8 = −3.00333e−008

| | |
|---|---|
| Focal length | 16.29 |
| F-number | 1.96 |
| Half angle of view (°) | 10.00 |
| Image height | 2.86 |
| Overall lens length | 25.31 |
| BF | 13.51 |

AB(1, 2)
unit mm
Surface data

| Surface | r | d | nd | vd | Effective diameter |
|---|---|---|---|---|---|
| 1* | 8.821 | 9.32 | 1.51633 | 64.1 | 5.00 |
| 2 | −4.884 | 0.50 | | | 5.28 |
| 3 | −4.507 | 4.94 | 1.85400 | 40.4 | 5.05 |
| 4 | −13.688 | 10.65 | | | 7.05 |
| image plane | ∞ | | | | |

Aspheric Data
First surface

K = 0.00000e+000  A 4 = −2.96824e−004  A 6 = 4.74218e−005
A 8 = −4.54054e−006

| | |
|---|---|
| Focal length | 19.99 |
| F-number | 4.00 |
| Half angle of view (°) | 10.00 |
| Image height | 3.52 |
| Overall lens length | 25.41 |
| BF | 10.65 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-120228, filed on Jun. 27, 2019 which is hereby incorporated by reference herein in its entirety.

What is claimed is:

1. An optical apparatus comprising:
a lens part including a first imaging portion forming a first image of an object and a second imaging portion forming a second image of the object; and
a filter part including a filter arranged on at least one of optical axes of the first and second imaging portions and configured to make properties of light for forming the first image and light for forming the second image different from each other,
wherein the first and second images correspond to a common field stop,
wherein F numbers of the first and second imaging portions are different from each other,
wherein the following expressions are satisfied:

$$Tno1 = f1/\sqrt{(4/\pi \times S1 \times Tr1)}, \text{ and}$$

$$Tno2 = f2/\sqrt{(4/\pi \times S2 \times Tr2)}$$

where f1, S1, Tr1 are respectively a focal length, an area of an aperture, and a transmittance per unit area of the aperture of the first imaging portion, and f2, S2, Tr2 are respectively a focal length, an area of an aperture, and a transmittance per unit area of the aperture of the second imaging portion, and
wherein the values of Tno1 and Tno2 are different from each other.

2. The optical apparatus according to claim 1, wherein the first and second imaging portions respectively form the first and second images on the same image plane.

3. The optical apparatus according to claim 1, wherein light that enters the lens part is collimated light.

4. The optical apparatus according to claim 1,
wherein the first imaging portion forms the first image on a first image section in an image plane,
wherein the second imaging portion forms the second image on a second image section adjacent to the first image section in the image plane,
wherein a maximum value of a distance from an optical axis of the first imaging portion to an effective area in a surface on the most object side of the first imaging portion is shorter than a minimum value of a distance from the optical axis of the first imaging portion to the first image section, and
wherein a maximum value of a distance from an optical axis of the second imaging portion to an effective area in a surface on the most object side of the second imaging portion is longer than a minimum value of a distance from the optical axis of the second imaging portion to the second image section.

5. The optical apparatus according to claim 1,
wherein the lens part includes a third imaging portion forming a third image of the object and a fourth imaging portion forming a fourth image of the object, and
wherein the filter part includes filters respectively arranged on optical axes of the third and fourth imaging portions and configured to make properties of light for forming the first image, light for forming the second image, light for forming the third image, and light for forming the fourth image different from each other.

6. The optical apparatus according to claim 1, wherein the filter included in the filter part changes a wavelength of incident light.

7. The optical apparatus according to claim 1, wherein the filter included in the filter part changes a polarization state of incident light.

8. The optical apparatus according to claim 1, further comprising a collimating optical system that is arranged on an object side of the lens part and that is common to the first and second imaging portions.

9. The optical apparatus according to claim 8, further comprising an objective lens that is arranged on an object side of the collimating optical system.

10. The optical apparatus according to claim 1, further comprising an objective lens that is arranged on an object side of the lens part and that is common to the first and second imaging portions.

11. The optical apparatus according to claim 1,
wherein the first imaging portion includes, in order from an object side to an image side, a lens unit having a positive refractive power, and a lens unit having a negative refractive power, and
wherein the second imaging portion includes, in order from the object side to the image side, a lens unit having a negative refractive power, and a lens unit having a negative refractive power.

12. The optical apparatus according to claim 1, wherein the optical apparatus is detachably mounted on an image pickup apparatus.

13. The optical apparatus according to claim 1, wherein angles of view of the first and second imaging portions are equal.

14. The optical apparatus according to claim 1, wherein the filter receives all the light before or after passing through the corresponding imaging portion.

15. An imaging system comprising:
an optical apparatus according to claim 1; and
an image sensor that receives light from the optical apparatus.

16. An optical apparatus comprising:
a lens part including a first imaging portion forming a first image of an object and a second imaging portion forming a second image of the object; and
a filter part including a filter arranged on at least one of optical axes of the first and second imaging portions and configured to make properties of light for forming the first image and light for forming the second image different from each other,
wherein the first and second images correspond to a common field stop,
wherein F numbers of the first and second imaging portions are different from each other,
wherein the first imaging portion forms the first image on a first image section in an image plane,
wherein the second imaging portion forms the second image on a second image section adjacent to the first image section in the image plane,
wherein a maximum value of a distance from an optical axis of the first imaging portion to an effective area in a surface on the most object side of the first imaging portion is shorter than a minimum value of a distance from the optical axis of the first imaging portion to the first image section, and
wherein a maximum value of a distance from an optical axis of the second imaging portion to an effective area in a surface on the most object side of the second imaging portion is longer than a minimum value of a distance from the optical axis of the second imaging portion to the second image section.

17. An optical apparatus comprising:
a lens part including a first imaging portion forming a first image of an object and a second imaging portion forming a second image of the object; and
a filter part including a filter arranged on at least one of optical axes of the first and second imaging portions and configured to make properties of light for forming the first image and light for forming the second image different from each other,
wherein the first and second images correspond to a common field stop,
wherein F numbers of the first and second imaging portions are different from each other,
wherein the first imaging portion includes, in order from an object side to an image side, a lens unit having a positive refractive power, and a lens unit having a negative refractive power, and
wherein the second imaging portion includes, in order from the object side to the image side, a lens unit having a negative refractive power, and a lens unit having a negative refractive power.

* * * * *